US010981469B2

(12) United States Patent
Muniz et al.

(10) Patent No.: US 10,981,469 B2
(45) Date of Patent: *Apr. 20, 2021

(54) DESIRED DEPARTURE TEMPERATURE FOR A BATTERY IN A VEHICLE

(71) Applicant: Wisk Aero LLC, Mountain View, CA (US)

(72) Inventors: Thomas P. Muniz, Sunnyvale, CA (US); Ke Zhang, Sunnyvale, CA (US); John Melack, Redwood City, CA (US)

(73) Assignee: WISK AERO LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/805,659

(22) Filed: Feb. 28, 2020

(65) Prior Publication Data
US 2020/0262313 A1 Aug. 20, 2020

Related U.S. Application Data

(63) Continuation of application No. 16/277,812, filed on Feb. 15, 2019, now Pat. No. 10,604,028.

(51) Int. Cl.
*G01C 23/00* (2006.01)
*G05D 1/00* (2006.01)
*G05D 3/00* (2006.01)
*G06F 7/00* (2006.01)
*G06F 17/00* (2019.01)
*B60L 58/26* (2019.01)
*B60L 53/64* (2019.01)
*B60L 53/66* (2019.01)
*B60L 58/27* (2019.01)

(52) U.S. Cl.
CPC ............... *B60L 58/26* (2019.02); *B60L 53/64* (2019.02); *B60L 53/665* (2019.02); *B60L 58/27* (2019.02)

(58) Field of Classification Search
CPC ........ B60L 53/64; B60L 53/665; B60L 58/26; B60L 58/27
See application file for complete search history.

(56) References Cited

U.S. PATENT DOCUMENTS

| 10,640,004 B2 * | 5/2020 | Patel | B60L 11/1875 |
| 2011/0066310 A1 * | 3/2011 | Sakai | B60L 7/16 701/22 |

(Continued)

FOREIGN PATENT DOCUMENTS

WO 2019002193 A1 1/2019

OTHER PUBLICATIONS

U.S. Appl. No. 16/277,812, "Non-Final Office Action" dated Apr. 18, 2019, 8 pages.

(Continued)

*Primary Examiner* — Harry Y Oh
(74) *Attorney, Agent, or Firm* — Kilpatrick Townsend & Stockton LLP

(57) ABSTRACT

A desired departure temperature is determined for a battery, having a temperature, in a vehicle based at least in part on trip information associated with a trip. A temperature controlling system is used to bring the temperature of the battery towards the desired departure temperature, wherein the vehicle begins the trip with the battery at the desired departure temperature.

20 Claims, 9 Drawing Sheets

(56) References Cited

U.S. PATENT DOCUMENTS

| | | | |
|---|---|---|---|
| 2013/0183554 A1* | 7/2013 | Takanezawa | H01M 10/486 |
| | | | 429/62 |
| 2014/0002025 A1* | 1/2014 | Yamamoto | B60L 58/12 |
| | | | 320/109 |
| 2014/0159670 A1* | 6/2014 | Lee | B60L 3/0046 |
| | | | 320/134 |
| 2016/0059733 A1* | 3/2016 | Hettrich | H04W 4/029 |
| | | | 701/2 |
| 2016/0144730 A1 | 5/2016 | Liu | |
| 2016/0325637 A1* | 11/2016 | Payne | B60L 53/14 |
| 2017/0217328 A1 | 8/2017 | Patel | |
| 2018/0072183 A1* | 3/2018 | Nomura | H01M 10/425 |
| 2018/0170208 A1* | 6/2018 | Park | H01M 10/625 |
| 2018/0252774 A1* | 9/2018 | Ciaccio | H01M 10/625 |
| 2018/0261896 A1* | 9/2018 | Ogawa | B60L 58/13 |
| 2018/0345816 A1* | 12/2018 | Sakakibara | B60L 11/1875 |
| 2020/0164763 A1* | 5/2020 | Holme | B60L 58/10 |

OTHER PUBLICATIONS

U.S. Appl. No. 16/277,812, "Notice of Allowance" dated Nov. 20, 2019, 6 pages.
International Search Report and Written Opinion—PCT/US2019/018896—ISA/US—dated May 14, 2019, 8 pages.

* cited by examiner

DESIRED DEPARTURE TEMPERATURE FOR A BATTERY IN A VEHICLE

CROSS-REFERENCE TO RELATED APPLICATIONS

This application is continuation of U.S. Non-Provisional application Ser. No. 16/277,812, filed on Feb. 15, 2019, and titled "Desired Departure Temperature for a Battery in a Vehicle," which is hereby incorporated by reference in its entirety for all purposes.

BACKGROUND OF THE INVENTION

Vehicles, such as cars and aircraft, are becoming increasingly powered by batteries. Techniques to better manage and/or utilize batteries in vehicles would be desirable. For example, it would be desirable if such techniques could prolong the lifetime of such batteries and/or produce better performing batteries.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of techniques to determine a desired departure temperature and bring the temperature of the battery closer towards (and sometimes to) the desired departure temperature at a departure time are described herein. Batteries tend to have higher performance (e.g., higher power output, a longer range, etc.) when they are warm. However, the downside of a warmer battery is that batteries generally tend to degrade more quickly the warmer they are. In some embodiments, a desired departure temperature is calculated and the battery is set to (or at least closer to) that temperature at the time of the vehicle's departure (e.g., at the time of takeoff in the case of an aircraft). This can strike a balance between battery performance and degradation and/or ensure that the temperature of the battery remains within some desired temperature range during the entirety of a trip.

Figure 1:
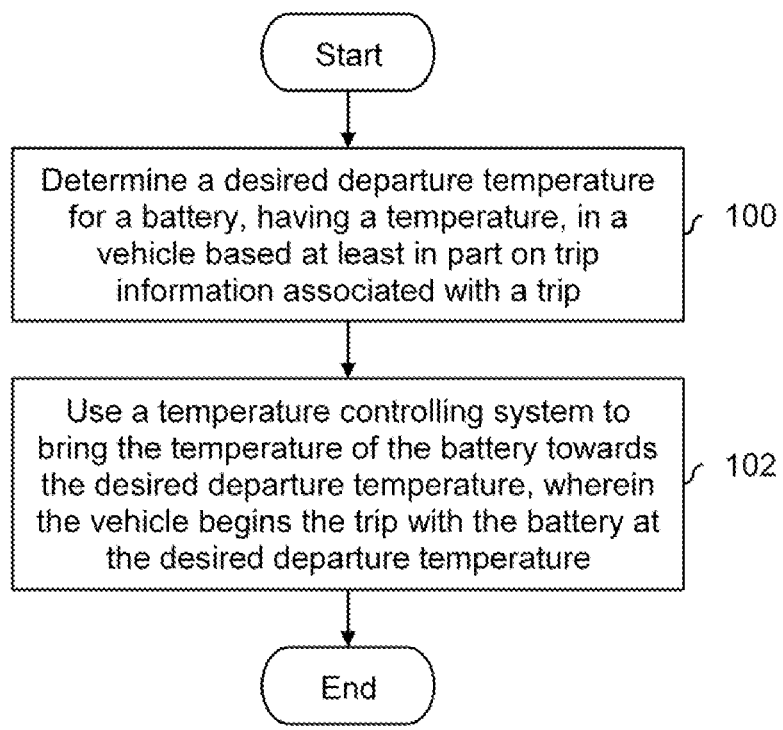
FIG. 1 is a flowchart illustrating an embodiment of a process to determine a desired departure temperature and get a battery in a vehicle to that desired departure temperature.

FIG. 1 is a flowchart illustrating an embodiment of a process to determine a desired departure temperature and get a battery in a vehicle to that desired departure temperature. In various embodiments, the vehicle may be an electric car, an electric aircraft, etc. In some embodiments, the process is performed while the vehicle is being charged at a charging station.

At 100, a desired departure temperature for a battery, having a temperature, in a vehicle is determined based at least in part on trip information associated with a trip. For example, the trip may be an upcoming or next trip for the vehicle (e.g., an electric car, electric aircraft, etc.) and the desired departure temperature is calculated or otherwise determined before that trip begins.

The type(s) of information included in the trip information may vary from embodiment to embodiment. In some embodiments, the trip information is relatively simple piece of information, such as a (e.g., expected or planned) trip duration, a destination (e.g., where the point of origin is known since the vehicle is at rest), a trip distance, etc.

In some embodiments, a pilot, driver, or passenger (e.g., if the vehicle is an autonomous vehicle) is asked for trip information which is used at step 100. Examples are "How long do you plan to fly/drive for your next flight/trip?"

"Where are you flying/driving to?" and so on. In such embodiments, it may be attractive to ask for relatively simple pieces of trip information (such as those examples described above) because the pilot or driver should be able to answer those questions. For example, in one scenario where the pilot or driver owns and operates the vehicle, the pilot or driver is asked for the trip information when the vehicle is connected to a charging station and/or at the end of a previous trip (e.g., the night before the next day's trip). In another example where the vehicle is part of a ride service scenario (e.g., where a vehicle is dispatched to pick up and drop off a passenger) and/or an autonomous vehicle scenario (e.g., where the person does not fly or drive the vehicle), the passenger already has to specify a pickup and/or drop off location and so the passenger is already providing the trip information.

In some embodiments, more detailed and/or specific information is included in or otherwise comprises the trip information. For example, the trip information may include a trip plan (including a flight plan for an aircraft), such as the path the vehicle will take from its current location to the destination. In some embodiments, the flight or trip information includes speed and/or time information so it is known how fast the vehicle will be flying (e.g., on average or throughout the trip) which may affect battery usage and therefore battery temperature. In some embodiments, a flight plan includes instances and/or durations where a VTOL aircraft will hover mid-air (e.g., where hovering consumes significantly more power and therefore generates significantly more heat compared to forward flight). More detailed and/or specific trip information may be desirable because it produces a more accurate and/or precise desired departure temperature. In some cases, more detailed and/or specific trip information may enable the temperature controlling system to be used more efficiently. For example, with a more accurate and/or specific desired departure temperature (due to the more detailed and/or specific trip information), the temperature controlling system may have a smaller margin for error which reduces the amount of unnecessary and/or extraneous cooling or heating.

In one example, it is desirable and/or preferable for batteries to operate within a desired battery temperature range (e.g., [$\infty$, $T_{max}$], [$T_{min}$, $\infty$], [$T_{min}$, $T_{max}$], etc.) over the course of a trip. For example, if a battery becomes too hot, it may be dangerous to use. To that end, in some embodiments, trip information is used to determine a desired departure temperature (which the battery will then be set to at the time of departure) which will ensure that the battery remains within some desired battery temperature range over the duration of the (upcoming) trip even as the battery warms up due to use during the trip.

In some embodiments, an optimizer in combination with a battery model is used to determine the desired departure temperature. For example, various and/or test desired departure temperatures can be input to the battery model which then models the behavior of the battery (e.g., given the trip information). An optimizer may then examine the outputs of the battery model and optimize some cost function so that the best or optimal desired departure temperature is selected.

In some embodiments, additional factors or inputs may be used at step 100 to calculate or otherwise determine the desired departure temperature. For example, state of health information associated with the battery (cell(s)) such as cell internal resistances (e.g., the voltage drop of the cell for a given current where this voltage drop represents the energy lost as heat within the battery) and cell capacities (e.g., the lowest charge capacity of any cell in the battery) may be used to determine the desired departure temperature. Generally speaking, the health of a battery (e.g., represented or otherwise measured by the health metrics) affects the temperature-dependent performance of the battery as well as the temperature-dependent degradation of the battery. Unhealthy batteries tend to require higher temperatures to produce maximum power but also heat more quickly so depending upon mission or flight objectives and the specific state of health of a battery, an unhealthy battery may in some cases need a higher departure temperature or a lower departure temperature. In some embodiments, the battery has one or more built-in and/or internal battery management systems which monitor and/or estimate such health metrics and output these health metrics (e.g., when the vehicle is plugged into a charging station the health metrics are passed to the charging station which in turn can provide them to the appropriate device for the departure and/or takeoff temperature calculation). In some embodiments, such a battery management system obtains all cell internal resistances and capacities so that an accurate simulation and/or optimization can be performed.

In some embodiments, the ambient (e.g., air) temperature and density is used at step 100 in order to better estimate battery temperature during the trip. Air density affects the power required for flight, and the ambient temperature affects any cooling or heating driven by a difference in temperature between the battery and the environment.

At 102, a temperature controlling system is used to bring the temperature of the battery towards the desired departure temperature, wherein the vehicle begins the trip with the battery at the desired departure temperature. In some embodiments, the temperature controlling system does not bring the temperature of the battery entirely or all the way to the desired departure temperature. For example due to time limitations (e.g., the vehicle is fully charged and/or it is time to depart), it may be undesirable to continue heating or cooling the vehicle and it would be preferable (at least in some cases) to stop heating or cooling so that the vehicle can depart.

In some embodiments, the temperature controlling system is part of some infrastructure (e.g., co-located and/or in communication with a charging station that charges the battery) which does not travel with the vehicle to keep weight down. In one example, the temperature controlling system is equipped with a heating element (e.g., it can blow hot air across the battery, causing the temperature of the battery to go up) and/or a cooling element (e.g., it can blow cold air across the battery, causing the temperature of the battery to go down) which is detachably coupled to the vehicle and/or the battery. The temperature controlling system then blows hot or cold air across the battery to bring the battery to (or at least closer to) the specified temperature so that the battery is at the desired departure temperature at the time of departure. Then, when the vehicle departs for the trip (e.g., takes off, drives off, etc.) the battery will be at (or at least closer to) the desired departure temperature and ideally remains within a desired battery temperature range throughout the trip. Naturally, any appropriate temperature controlling system may be used, including ones with different types of thermal conductors such as a liquid thermal conductor, a solid thermal conductor, etc.

It may be helpful to show a system which performs the process of FIG. 1. The following figure shows an example where the vehicle is a vertical takeoff and landing (VTOL) aircraft and the temperature controlling system is an external temperature controlling system.

Figure 2:
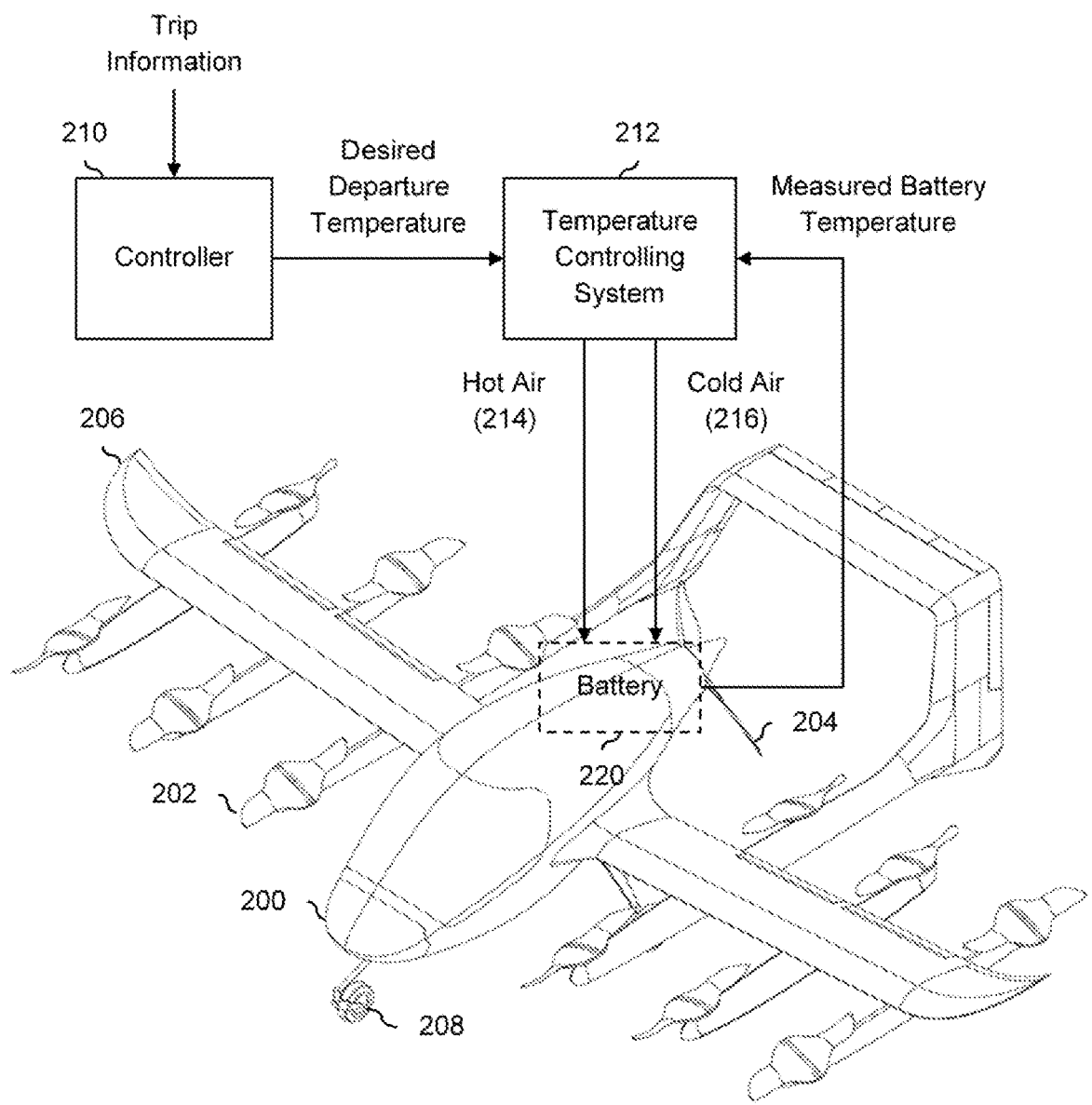
FIG. 2 is a diagram illustrating an embodiment of a vertical takeoff and landing (VTOL) aircraft and an external temperature controlling system.

FIG. 2 is a diagram illustrating an embodiment of a vertical takeoff and landing (VTOL) aircraft and an external temperature controlling system. In the example shown, aircraft 200 is a VTOL aircraft that is on the ground and is being charged (not shown). To take off, the vertical lift fans (202) would be turned on. The downward thrust produced by the vertical lift fans (202) permits the aircraft to take off and ascend vertically. Once airborne, the forward propeller (204), which is mounted or otherwise coupled to the back of the fuselage, is turned on so that the vehicle begins to move forwards. Once the vehicle is moving forwards fast enough, there will be sufficient aerodynamic lift force acting on the wings (206) to keep the aircraft airborne. At that point, the vertical lift fans (202) are turned off while the forward propeller (204) stays on. To land, the vehicle can either land vertically using the vertical lift fans (202) or perform a traditional landing, rolling on its wheels (208) once the aircraft touches down.

In this example, controller 210 receives or otherwise inputs the trip information and generates a desired departure temperature. In some embodiments, controller 210 is also responsible for managing battery charging and/or gets battery state of health information directly from the battery management system. In addition to the examples above where a driver, pilot, or passenger provides the trip information (which is input to and used by controller 210), in some embodiments the controller or some other entity estimates the trip information based on historic information (e.g., without asking a driver, pilot, or passenger). For example, if the exemplary vehicle tends to make trips to a certain destination, then that historic information (i.e., the previously and frequently visited destination) is used to generate (or be) the trip information which is input to controller 210.

The desired departure information is passed from controller 210 to temperature controlling system 212 (e.g., a ground or fixed temperature controlling system which stays on the ground and/or remains at some fixed location). In this example, the temperature controlling system has hoses or other connectors which are detachably coupled to the vehicle. Depending upon whether the battery (220) needs to be heated or cooled, the temperature controlling system will either blow hot air (214) or cold air (216) over the battery to heat or cool the battery, respectively, to bring the battery to the desired departure temperature. A measured battery temperature is sent from the battery (220) to the temperature controlling system (212) so that the latter knows whether the battery's temperature needs to go up, down, or remain the same.

As will be described in more detail below, depending upon the type of maneuvers or flying the exemplary vehicle is performing, the amount of heat produced by the battery (220) can vary. For example, if the aircraft is hovering or taking off or landing vertically (i.e., and is relying upon the vertical lift fans (202) to keep the aircraft airborne) then more heat may be produced by the batteries compared to when the vertical lift fans are off and the aircraft is moving forwards fast enough so that the aerodynamic lift force on the wings is keeping the aircraft airborne. Similarly, climbing to a higher altitude or flying at higher speeds will produce more heat in the battery. These are just some examples of how different types of maneuvers or flying can affect the amount of heat produced by the battery (and therefore can affect the desired departure temperature which is calculated or otherwise determined from the trip information).

Figure 3:
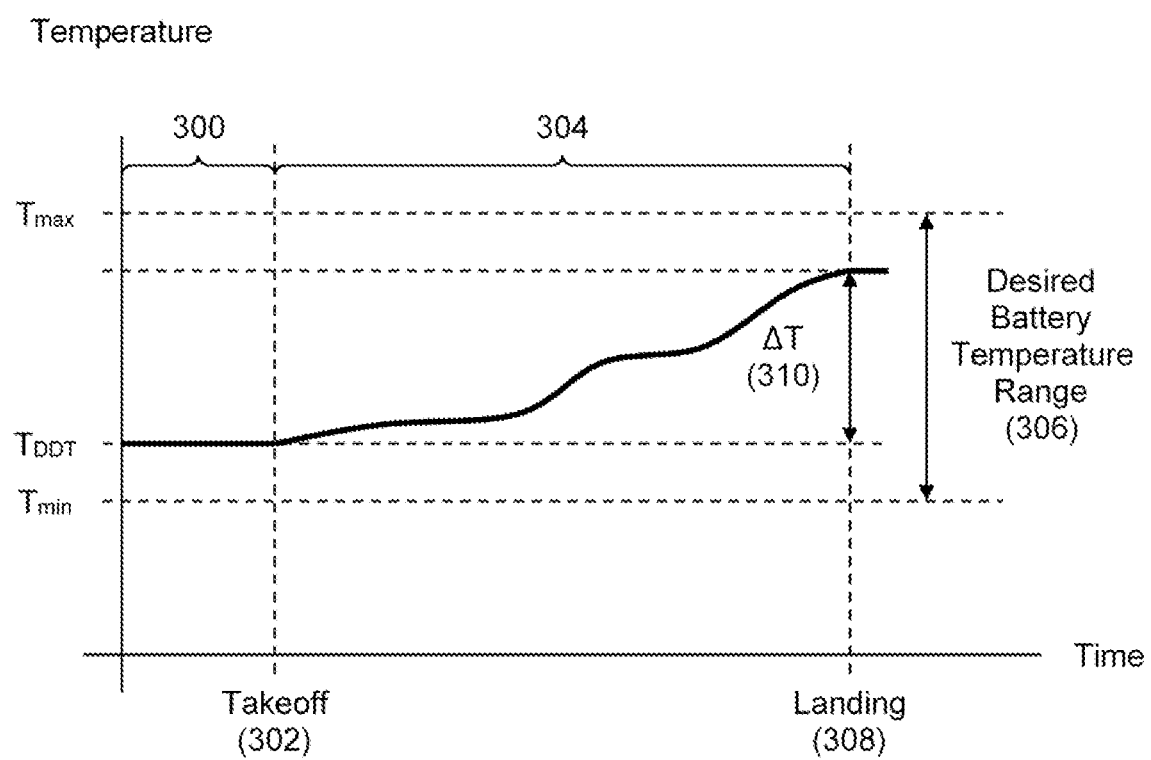
FIG. 3 is a graph illustrating an embodiment of the temperature of a battery in a vehicle before takeoff, during the drip, and after landing.

FIG. 3 is a graph illustrating an embodiment of the temperature of a battery in a vehicle before takeoff, during the drip, and after landing. In this example, the vehicle is an aircraft but naturally in some other embodiments the vehicle is some other type of vehicle (e.g., a car). In the example shown, the battery in the vehicle is set to the desired departure temperature ($T_{DDT}$) prior to takeoff (i.e., during period 300). For example, the vehicle may be detachably coupled to a temperature controlling system, such as that shown in FIG. 2.

When the takeoff occurs at 302, the battery is (already) at the desired departure temperature ($T_{DDT}$). During the flight (i.e., period 304), the temperature of the battery gradually increases but always remains between the desired battery temperature range (306), which in this example ranges from $T_{min}$ to $T_{max}$, even at landing (308) when the battery temperature tends to be the hottest. In some other embodiments, the desired battery temperature range is open-ended at one extreme (e.g., there is only a $T_{min}$ or only a $T_{max}$).

As shown here, calculating a desired departure temperature and getting the battery to that temperature at the time of departure, the battery will operate during the entirety of the trip (i.e., period 304) within some safe and/or desirable battery temperature range (306). In contrast, if the techniques described herein are not applied and the battery is at some ambient or room temperature at the time of departure, the battery may operate outside of some desirable battery temperature range during the flight which may be dangerous and force the aircraft to land early. This problem may be more noticeable and/or especially acute during extremely hot weather (e.g., at or above 100° F.) when the battery is operating in a high ambient temperature environment. Similarly, in extremely cold weather (e.g. at or below 0° F.) the battery temperature could decrease in flight outside of acceptable range if the takeoff battery temperature was not high enough.

The following figure describes this example more generally and/or formally in a flowchart.

Figure 4:
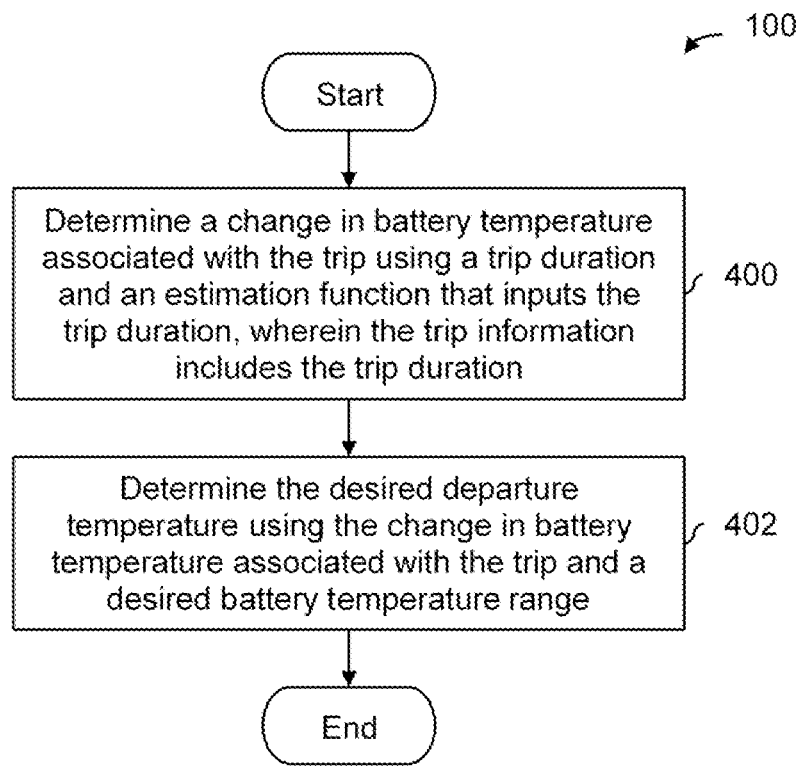
FIG. 4 is a flowchart illustrating an embodiment of a process to determine a desired departure temperature using a trip duration and an estimation function.

FIG. 4 is a flowchart illustrating an embodiment of a process to determine a desired departure temperature using a trip duration and an estimation function. In some embodiments, step 100 in FIG. 1 is performed using the example process shown here.

At 400, a change in battery temperature associated with the trip is determined using a trip duration and an estimation function that inputs the trip duration, wherein the trip information includes the trip duration. That is, $\Delta T = f(t_{trip\_duration})$ where $\Delta T$ is the change in battery temperature over the course of the trip, f(t) is the estimation function (e.g., which inputs a unit of time and outputs a unit of temperature such as ° F., ° C., etc.), and $t_{trip\_duration}$ is the trip duration (e.g., in minutes, hours, etc.). $\Delta T$ (310) in FIG. 3 shows an example of a change in battery temperature (e.g., that is estimated or otherwise determined at step 400).

In some embodiments, the estimation function is a multivariable function and/or f(t) is selected based at least in part on one or more other inputs. For example, depending upon the ambient temperature, an appropriate f(t) may be selected. To put it another way, depending upon the ambient temperature, the change in battery temperature will vary even if the trip duration is the same.

At 402, the desired departure temperature is determined using the change in battery temperature associated with the trip and a desired battery temperature range. For example, step 402 will attempt, where possible, to keep the battery temperature within the desired battery temperature range over the course of the entire trip.

In one example of step 402, if the change in battery temperature (e.g., determined at step 400) is less than the desired battery temperature range (where in this example it is assumed there is a $T_{min}$ and a $T_{max}$), then the desired departure temperature is determined so that the temperature margin at takeoff (e.g., $T_{DDT}-T_{min}$) equals the temperature margin at landing (e.g., $T_{max}-(T_{DDT}+\Delta T)$). For example, this approach may leave some temperature margin at landing (and overheating may be more of a concern than operating at too cold of a temperature) while not requiring the temperature controlling system to cool the battery all the way down to $T_{min}$. To put it another way, cooling the battery down to some temperature above $T_{min}$ consumes less power (at the temperature controlling system) than cooling the battery all the way down to $T_{min}$ while still providing some margin on the upper temperature range at landing.

Figure 5:
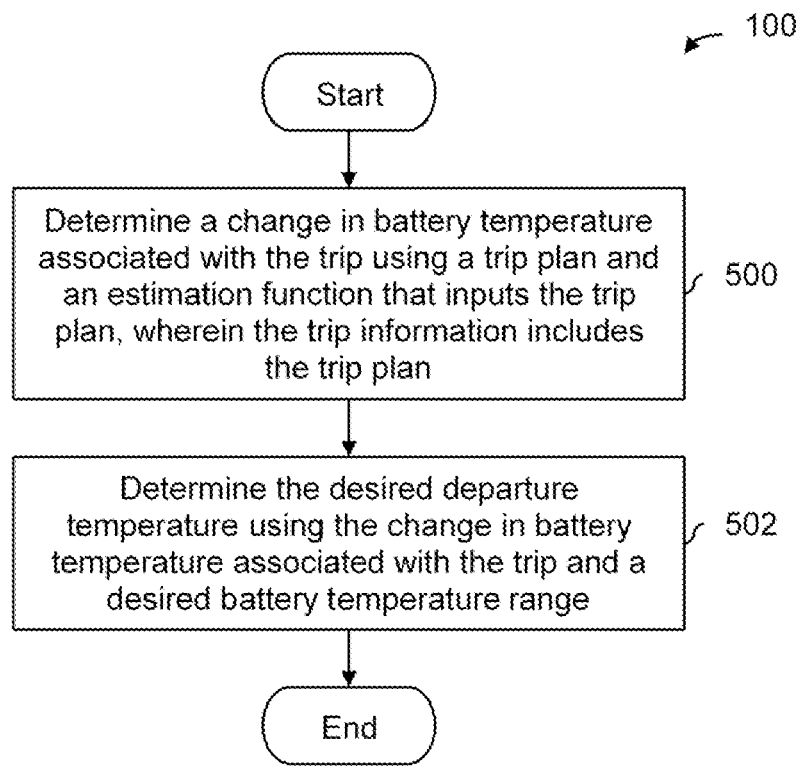
FIG. 5 is a flowchart illustrating an embodiment of a process to determine a desired departure temperature using a trip duration and an estimation function.

FIG. 5 is a flowchart illustrating an embodiment of a process to determine a desired departure temperature using a trip duration and an estimation function. In some embodiments, step 100 in FIG. 1 is performed using the example process shown here.

At 500, a change in battery temperature associated with the trip is determined using a trip plan and an estimation function that inputs the trip plan, wherein the trip information includes the trip plan. For example, if the vehicle is an aircraft then the trip plan may be a flight plan. In some embodiments, the flight plan includes speed(s) and/or time(s) so that some sense of how hard the battery is being drawn upon is obtained.

In some embodiments, a trip plan (e.g., a flight plan) is fed into a simulator (e.g., flight simulator which inputs desired forces and moments and outputs desired thrusts or other commands for the motors and/or propellers) and the outputs from the simulator are passed to the estimator which uses the simulator outputs to estimate the change in battery temperature. For example, by using a simulator of how the vehicle will respond, a more accurate desired departure temperature can be determined.

At 502, the desired departure temperature is determined using the change in battery temperature associated with the trip and a desired battery temperature range. For example, some of the examples described above with respect to step 402 in FIG. 4 may be used.

In some embodiments, a battery model and an optimizer are used to determine a desired departure temperature. The following figures describe one such example.

Figure 6A:
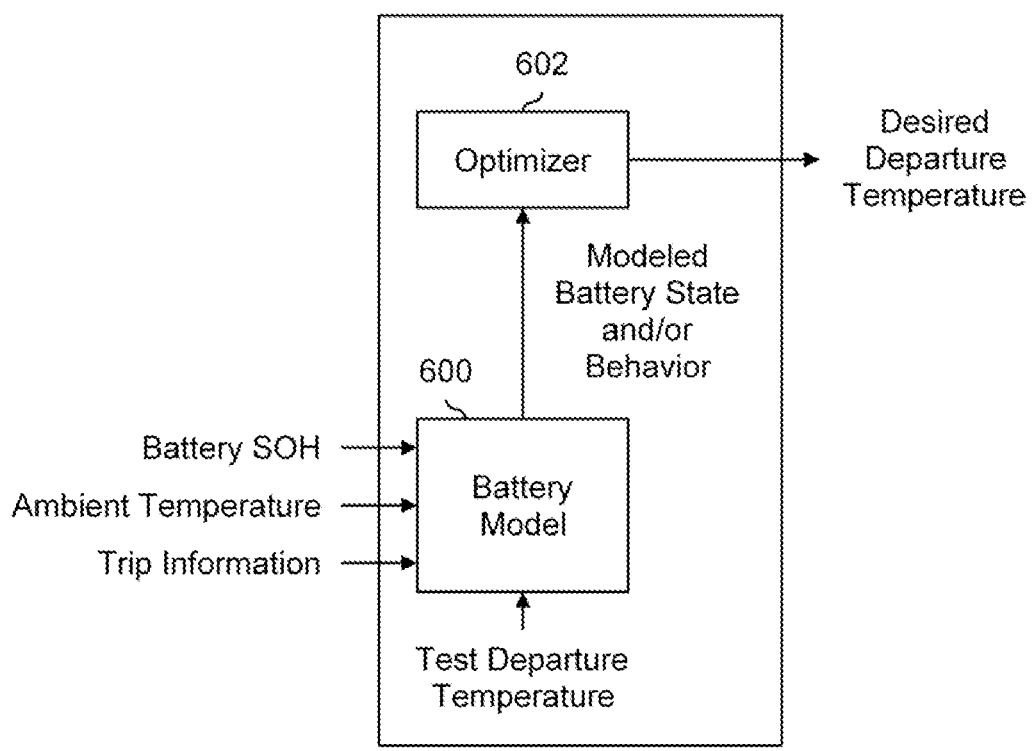
FIG. 6A is a diagram illustrating an embodiment of a battery model and an optimizer which are used to determine a desired departure temperature.

FIG. 6A is a diagram illustrating an embodiment of a battery model and an optimizer which are used to determine a desired departure temperature. In the example shown, a battery model models how a battery responds or behaves given certain input parameters. In this example, battery model 600 inputs battery state of health (SOH) information (e.g., describing or representing the age or wear of the battery, generally indicating how "healthy" the battery is, etc.), the ambient (e.g., air) temperature, and trip information. For example, the battery state of health information may be reported by a built-in battery management system which monitors and/or estimates the current health of the battery. This information may be communicated from the built-in battery management system to a battery charger, and from the battery charger to the system shown here.

With the specified inputs or parameters described above, the battery model (600) will model the state and/or behavior of the battery for a variety of test departure temperatures. For each test departure temperature, modeled battery state and/or behavior information is sent from the battery model (600) to the optimizer (602). The optimizer evaluates a cost function using the modeled information and selects the test departure temperature which has the lowest (evaluated) cost function value. For example, the cost function may weigh the benefits of a warmer battery (e.g., better performance) against the drawbacks of a warmer battery (e.g., tends to degrade faster) and the evaluated cost function is a representation of that pro-con assessment for a given test departure temperature.

In some applications it is undesirable for a vehicle to wait around simply for a temperature controlling system to bring the battery in the vehicle to the desired departure temperature (e.g., the battery is fully charged; the driver, pilot, or passenger wants to depart and is waiting; etc.). To account for this, in some embodiments, the cost function takes into account things like time to departure (e.g., which may be included in trip information), time to charge (e.g., which may be reported by the charging station), and/or time to heat/cool (e.g., estimated for a given desired departure temperature). For example, if the time to departure is "as soon as charging is done" (or is a time or duration earlier or shorter than the time to charge), then the desired departure temperatures which have a time to heat/cool that is greater than the time to charge would be penalized (e.g., have a higher evaluated cost function) more than the desired departure temperatures which have a time to heat/cool that is less than the time to charge.

It some embodiments there is an acceptable temperature window or range that is different (e.g., wider) than the desirable temperature range or window. In one example where it is desirable to depart as soon as possible, the departure temperature selected attempts to satisfy the acceptable temperature window but not necessarily the desirable temperature range or window. For example, the departure temperature selected or determines may be as hot as possible so as not to violate a constraint specified by acceptable temperature window (e.g., in cooling limited situations) or as cold as possible per the acceptable temperature window (e.g., heating limited situations).

In some embodiments, a cost function takes into account an amount of energy consumed by the temperature controlling system to bring a battery to a given desired departure temperature. For example, if the performance and/or degradation of a battery varies only slightly across a range of temperatures then it may not make sense to bring the battery to heat or cool the battery to a more extreme temperature from its current temperature.

In some embodiments, the battery state and/or behavior information generated by the battery model varies with and/or is a function of time. For example, with more detailed and/or specific trip information, some battery model embodiments are able to model the behavior of the battery over the course of the trip. In some embodiments, this ability to generate battery state information which is a function of time (e.g., over the course of the trip) permits better quality desired departure temperatures to be generated.

The following figure shows an example of a cost function generated by optimizer 602.

Figure 6B:
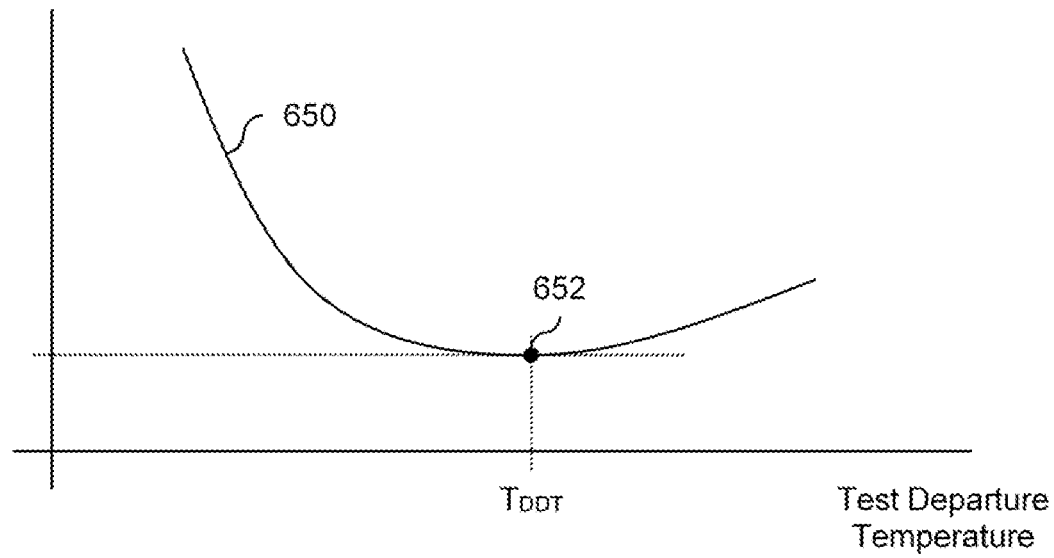
FIG. 6B is a graph illustrating an embodiment of an evaluated cost function.

FIG. 6B is a graph illustrating an embodiment of an evaluated cost function. In the example shown, cost function 650 is an example of an evaluated cost function which is generated by optimizer 602 in FIG. 6A for the modeled battery state and/or behavior information generated from the various test departure temperatures. In this example, local minimum 652 has the lowest cost associated with it. As such, the test departure temperature corresponding to local minimum 652 is output as the desired departure temperature ($T_{DDT}$).

The following figure describes this example more generally and/or formally in a flowchart.

Figure 7:
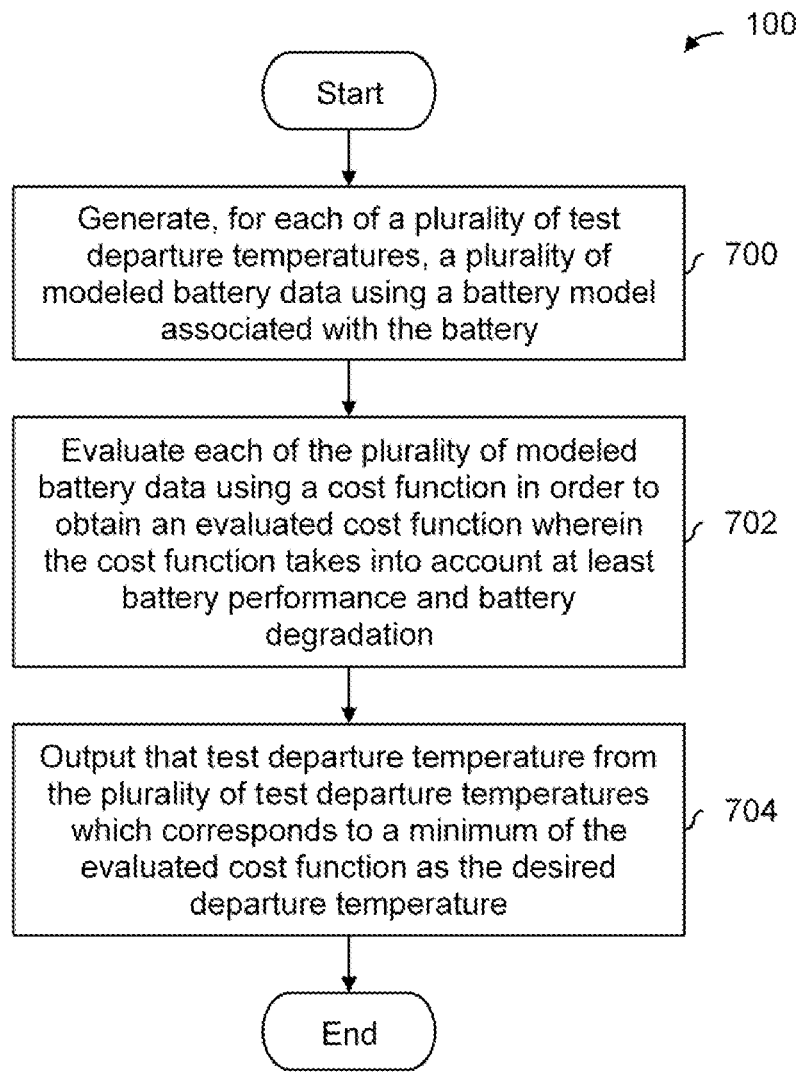
FIG. 7 is a flowchart illustrating an embodiment of a process to determine a desired departure temperature using a battery model and cost function.

FIG. 7 is a flowchart illustrating an embodiment of a process to determine a desired departure temperature using a battery model and cost function. In some embodiments, step 100 in FIG. 1 is performed using the example process shown here.

At 700, for each of a plurality of test departure temperatures, a plurality of modeled battery data is generated using a battery model associated with the battery. See, for example, battery model 600 in FIG. 6A. For each test departure temperature in the plurality of test departure temperatures (e.g., To, Ti, etc.), corresponding modeled battery data (e.g., battery state and/or behavior information output by the battery model) is produced.

At 702, each of the plurality of modeled battery data is evaluated using a cost function in order to obtain an evaluated cost function wherein the cost function takes into account at least battery performance and battery degradation. As described above, warmer temperatures tend to be better for battery performance (which is good) but also tend to degrade the battery faster (which is bad). Evaluated cost function 650 in FIG. 6B shows an example of an evaluated cost function.

At 704, that test departure temperature from the plurality of test departure temperatures which corresponds to a minimum of the evaluated cost function is output as the desired departure temperature. See, for example, FIG. 6B where the test departure temperature which corresponds to local minimum 652 is output as the desired departure temperature.

The following figure describes an example where the departure time is known ahead of time and this information is used to conserve power at the temperature controlling system. For brevity, the following examples are not shown in combination with the above examples but it is understood that any combination of the techniques described herein may be used.

Figure 8:
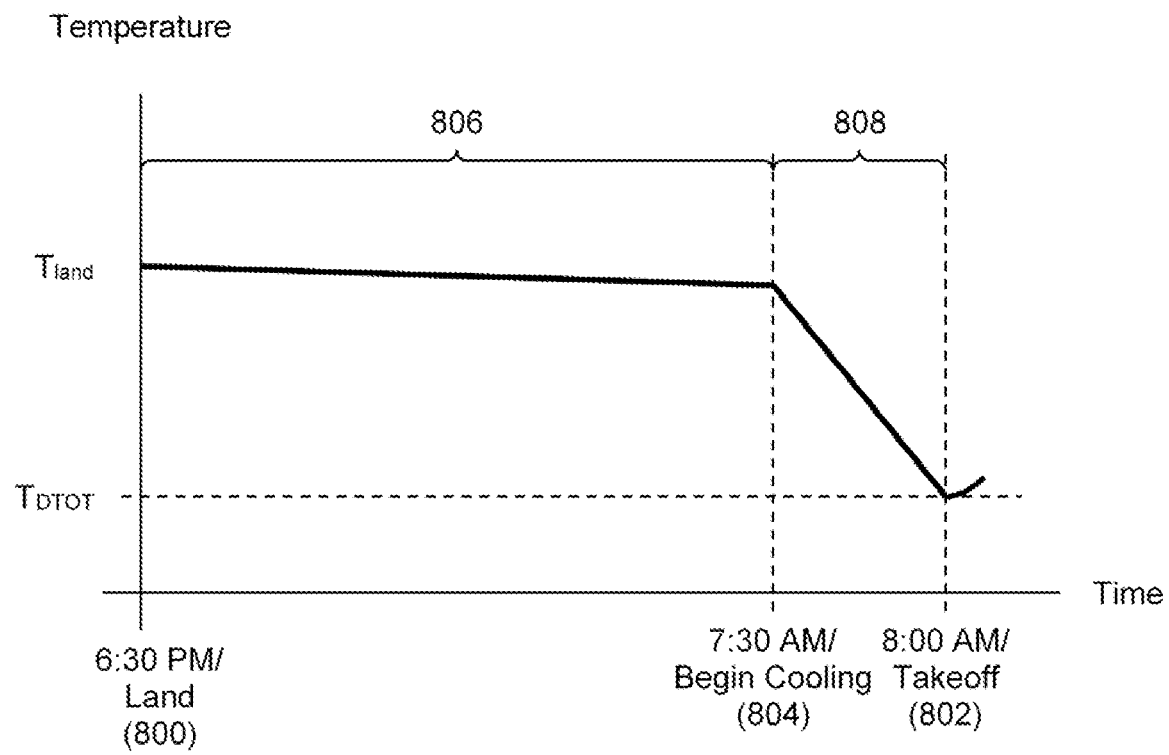
FIG. 8 is a diagram illustrating an embodiment of a vehicle where the departure time is known ahead of time and the temperature controlling system does not begin heating or cooling the battery until the departure is imminent.

FIG. 8 is a diagram illustrating an embodiment of a vehicle where the departure time is known ahead of time and the temperature controlling system does not begin heating or cooling the battery until the departure is imminent. In this example, the vehicle is an aircraft but naturally the techniques described herein may be applied toward other types of vehicles (e.g., cars).

In this example, the aircraft lands at 6:30 pm (800) with a battery temperature of $T_{land}$. A desired departure temperature (in this example, a desired takeoff temperature, $T_{DTOT}$) is calculated or otherwise determined upon landing and the resulting $T_{DTOT}$ is (strictly) less than $T_{land}$. Although the temperature controlling system could begin cooling the battery to the calculated $T_{DTOT}$, the aircraft is not going to take off until 8:00 am the next morning (802). If the temperature controlling system began cooling immediately (e.g., soon after landing), the temperature controlling system will have to work from approximately 6:30 pm to 8:00 am. However, it may not take that long to bring the battery down to $T_{DTOT}$ and therefore starting the temperature controlling system may therefore be a waste of power. (In an exception to the above example, at higher temperature battery generally tends to degrade faster; therefore, in some scenarios it may be helpful to cool the battery down first so that it can spend more time at lower temperature to preserve battery life.)

As such, to save power at the temperature controlling system, the system will (e.g., based on the desired departure temperature and the known takeoff time) estimate or otherwise determine a time at which to start the temperature controlling system so that the battery will be at the desired departure temperature at the takeoff time but without unnecessarily starting the temperature controlling system too soon. In this example, that time is determined to be 7:30 am (804). During period 806 (between landing at 800 and when cooling begins at 804), the temperature controlling system is off (e.g., to conserve power). During period 808 (beginning when cooling begins at 804 and up to takeoff at 802), the temperature controlling system is on in order to bring the temperature of the battery to the desired departure temperature. Although this example shows the battery being cooled, the techniques described herein are applicable even if the battery needs to be heated (e.g., during the winter).

This example is described more generally and/or formally in a flowchart below.

Figure 9:
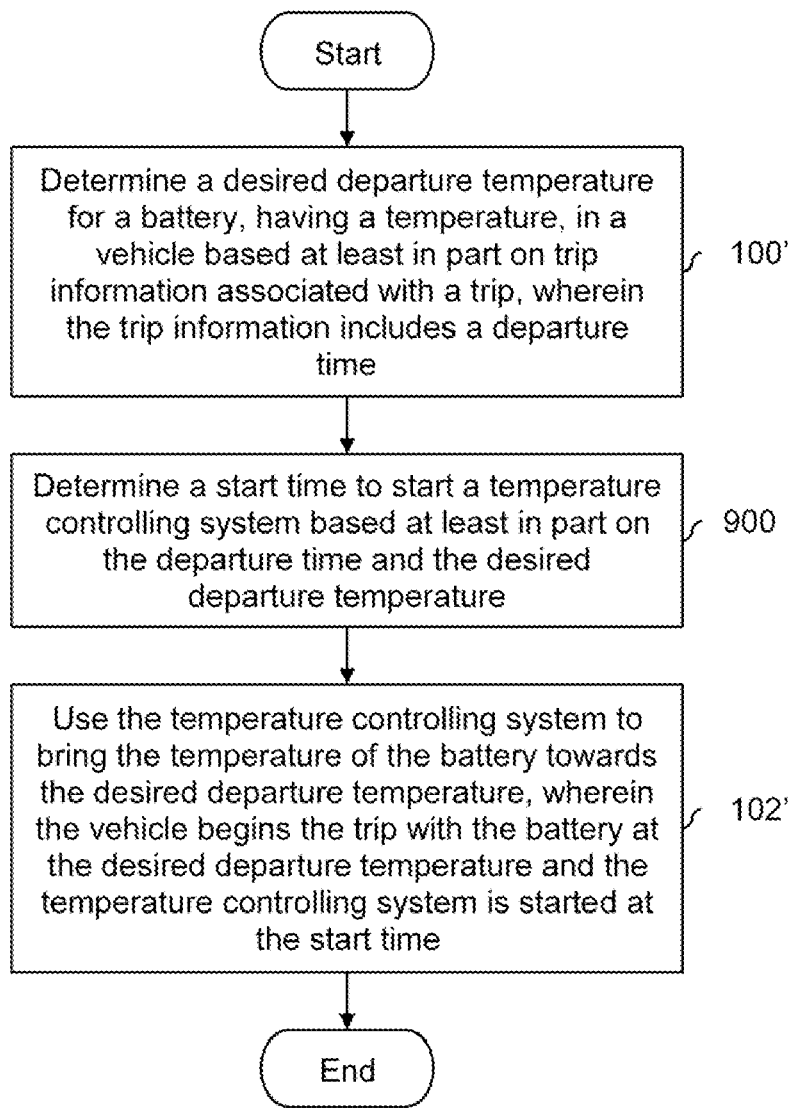
FIG. 9 is a flowchart illustrating an embodiment of a process to get a battery in a vehicle to a desired departure temperature, including by determining a start time for a temperature controlling system.

FIG. 9 is a flowchart illustrating an embodiment of a process to get a battery in a vehicle to a desired departure temperature, including by determining a start time for a temperature controlling system. FIG. 9 is related to FIG. 1 and for convenience related and/or similar steps are indicated using the same and/or similar reference numbers.

At 100', a desired departure temperature for a battery, having a temperature, in a vehicle is determined based at least in part on trip information associated with a trip, wherein the trip information includes a departure time. For example, suppose a vehicle arrives at some destination and is plugged into a charging station. At that time, the charging station or some related interface (e.g., on the user's smartphone) may ask the driver or pilot when they plan to depart. In some embodiments, this departure time is also used to manage or otherwise perform charging.

In some other embodiments, the departure time is not specified by a driver or pilot but rather is determined based on historic information. For example, if the driver or pilot has a regular commute or some routine, the departure time may be determined based on historic information (e.g., they tend to leave around the same time on weekdays). Any appropriate estimation technique may be used.

At 900, a start time to start a temperature controlling system is determined based at least in part on the departure time and the desired departure temperature. For example, the temperature controlling system may be able to heat or cool the battery at a rate of d degrees per minute and based on the current temperature of the battery and the departure time, the start time may be calculated. In some embodiments, step 900 includes periodically and/or continually performing a check of "Should the temperature controlling system start now?" given the current temperature, the desired departure temperature, and the heating or cooling rate of the temperature controlling system (e.g., a rate of d degrees per minute). For example, this may better account for and/or be more adaptable to the temperature change of the battery (e.g., as the battery cools throughout the night, assuming it is hot at landing).

At 102', the temperature controlling system is used to get the battery to the desired departure temperature, wherein the vehicle begins the trip with the battery at the desired departure temperature and the temperature controlling system is started at the start time. As described above, this saves power at the temperature controlling system since the temperature controlling system is not running unnecessarily.

It is noted that the process above includes situations in which the vehicle is being charged and it is desirable for the vehicle to depart as soon as charging has completed. For example, if the vehicle is used in a ride service where it picks up and drops off people throughout the day, it is desirable for the vehicle to depart as soon as charging is completed. As such, in some embodiments, a battery charging time (e.g., how long it will take for the battery in the vehicle to be charged) is received from a charging station to which the vehicle is detachably coupled and the departure time is determined based at least in part on the battery charging time.

In some cases, a battery charging time is less than the amount of time it would take to bring the battery down (e.g., completely or entirely) to the desired departure temperature, even if the temperature controlling system started immediately. In some such embodiments, the start time determined at step 900 is "immediately" and because it is undesirable to hold a fully-charged vehicle simply to finish bringing the battery (e.g., completely or entirely) to the desired departure temperature, step 102' includes stopping the temperature controlling system when a charging station finishes charging the battery (e.g., that is being heated or cooled) in the vehicle (e.g., assuming that the battery is sufficiently cooled or heated such that some acceptable battery temperature range is not violated).

Naturally, in some cases the battery charging time is greater than the amount of time it would take to bring the battery down (e.g., completely or entirely) to the desired departure temperature and a start time in the future is determined.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor; and
a memory coupled with the processor, wherein the memory is configured to provide the processor with instructions which when executed cause the processor to:
determine a desired departure temperature for a battery, having a temperature, in a vehicle based at least in part on an output of an estimation function that receives trip information associated with a trip as an input and outputs a change in battery temperature associated with the trip based on at least the trip information; and
use a temperature controlling system to bring the temperature of the battery towards the desired departure temperature, wherein the vehicle begins the trip with the battery at the desired departure temperature.

2. The system recited in claim 1, wherein the trip information includes one or more of the following: a trip duration, a destination, a trip distance, or a trip plan.

3. The system recited in claim 1, wherein determining the desired departure temperature is further based at least in part on one or more of the following: state of health information associated with the battery, an average cell internal resistance, a minimum cell capacity, or ambient temperature.

4. The system recited in claim 1, wherein the trip information includes a trip duration, wherein determining the desired departure temperature includes:
determining the change in battery temperature associated with the trip using the trip duration and the estimation function that inputs the trip duration; and
determining the desired departure temperature using the change in battery temperature associated with the trip and a desired battery temperature range.

5. The system recited in claim 1, wherein the trip information includes a trip plan, wherein determining the desired departure temperature includes:
determining the change in battery temperature associated with the trip using the trip plan and the estimation function that inputs the trip plan; and
determining the desired departure temperature using the change in battery temperature associated with the trip and a desired battery temperature range.

6. The system recited in claim 1, wherein determining the desired departure temperature includes:
generating, for each of a plurality of test departure temperatures, a plurality of modeled battery data using a battery model associated with the battery;
evaluating each of the plurality of modeled battery data using a cost function in order to obtain an evaluated cost function wherein the cost function takes into account at least battery performance and battery degradation; and
outputting that test departure temperature from the plurality of test departure temperatures which corresponds to a minimum of the evaluated cost function as the desired departure temperature.

7. The system recited in claim 1, wherein:
the trip information includes a departure time;
the memory is further configured to provide the processor with instructions which when executed cause the processor to: determine a start time to start the temperature controlling system based at least in part on the departure time and the desired departure temperature; and
the temperature controlling system is started at the start time.

8. A method, comprising:
providing trip information associated with a trip as an input to an estimation function;
determining a desired departure temperature for a battery, having a temperature, in a vehicle based at least in part on an output of an estimation function that receives trip information associated with a trip as an input and outputs a change in battery temperature associated with the trip based on at least the trip information; and
using a temperature controlling system to bring the temperature of the battery towards the desired departure temperature, wherein the vehicle begins the trip with the battery at the desired departure temperature.

9. The method recited in claim 8, wherein the trip information includes one or more of the following: a trip duration, a destination, a trip distance, or a trip plan.

10. The method recited in claim 8, wherein determining the desired departure temperature is further based at least in part on one or more of the following: state of health information associated with the battery, an average cell internal resistance, a minimum cell capacity, or ambient temperature.

11. The method recited in claim 8, wherein the trip information includes a trip duration, wherein determining the desired departure temperature includes:
determining the change in battery temperature associated with the trip using the trip duration and the estimation function that inputs the trip duration; and
determining the desired departure temperature using the change in battery temperature associated with the trip and a desired battery temperature range.

12. The method recited in claim 8, wherein the trip information includes a trip plan, wherein determining the desired departure temperature includes:

determining the change in battery temperature associated with the trip using the trip plan and the estimation function that inputs the trip plan; and determining the desired departure temperature using the change in battery temperature associated with the trip and a desired battery temperature range.

13. The method recited in claim 8, wherein determining the desired departure temperature includes:

generating, for each of a plurality of test departure temperatures, a plurality of modeled battery data using a battery model associated with the battery;

evaluating each of the plurality of modeled battery data using a cost function in order to obtain an evaluated cost function wherein the cost function takes into account at least battery performance and battery degradation; and outputting that test departure temperature from the plurality of test departure temperatures which corresponds to a minimum of the evaluated cost function as the desired departure temperature.

14. The method recited in claim 8, wherein:

the trip information includes a departure time;

the method further includes: determining a start time to start the temperature controlling system based at least in part on the departure time and the desired departure temperature; and the temperature controlling system is started at the start time.

15. A computer program product, the computer program product being embodied in a non-transitory computer readable storage medium and comprising computer instructions for:

providing trip information associated with a trip as an input to an estimation function;

determining a desired departure temperature for a battery, having a temperature, in a vehicle based at least in part on an output of an estimation function that receives trip information associated with a trip as an input and outputs a change in battery temperature associated with the trip based on at least the trip information; and using a temperature controlling system to bring the temperature of the battery towards the desired departure temperature, wherein the vehicle begins the trip with the battery at the desired departure temperature.

16. The computer program product recited in claim 15, wherein determining the desired departure temperature is further based at least in part on one or more of the following: state of health information associated with the battery, an average cell internal resistance, a minimum cell capacity, or ambient temperature.

17. The computer program product recited in claim 15, wherein the trip information includes a trip duration, wherein determining the desired departure temperature includes:

determining the change in battery temperature associated with the trip using the trip duration and the estimation function that inputs the trip duration; and determining the desired departure temperature using the change in battery temperature associated with the trip and a desired battery temperature range.

18. The computer program product recited in claim 15, wherein the trip information includes a trip plan, wherein determining the desired departure temperature includes:

determining the change in battery temperature associated with the trip using the trip plan and the estimation function that inputs the trip plan; and determining the desired departure temperature using the change in battery temperature associated with the trip and a desired battery temperature range.

19. The computer program product recited in claim 15, wherein determining the desired departure temperature includes:

generating, for each of a plurality of test departure temperatures, a plurality of modeled battery data using a battery model associated with the battery;

evaluating each of the plurality of modeled battery data using a cost function in order to obtain an evaluated cost function wherein the cost function takes into account at least battery performance and battery degradation; and outputting that test departure temperature from the plurality of test departure temperatures which corresponds to a minimum of the evaluated cost function as the desired departure temperature.

20. The computer program product recited in claim 15, wherein:

the trip information includes a departure time;

the computer program product further includes computer instructions for: determining a start time to start the temperature controlling system based at least in part on the departure time and the desired departure temperature; and the temperature controlling system is started at the start time.

* * * * *